US012544604B2

(12) United States Patent
Pellerano

(10) Patent No.: US 12,544,604 B2
(45) **Date of Patent: *Feb. 10, 2026**

(54) NOSE MASK

(71) Applicant: Dania Altagracia Pellerano, Albuquerque, NM (US)

(72) Inventor: Dania Altagracia Pellerano, Albuquerque, NM (US)

(73) Assignee: Dania Altagracia Pellerano, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,579

(22) Filed: Feb. 26, 2024

(65) Prior Publication Data

US 2024/0307715 A1 Sep. 19, 2024

Related U.S. Application Data

(63) Continuation of application No. 18/109,727, filed on Feb. 14, 2023, now Pat. No. 11,911,638, which is a continuation of application No. 17/074,577, filed on Oct. 19, 2020, now Pat. No. 11,602,649.

(51) Int. Cl.
*A62B 23/06* (2006.01)
*A41D 13/11* (2006.01)
*A62B 18/08* (2006.01)

(52) U.S. Cl.
CPC .......... *A62B 23/06* (2013.01); *A41D 13/1107* (2013.01); *A62B 18/084* (2013.01)

(58) Field of Classification Search
CPC . A62B 23/00–025; A62B 23/06; A62B 18/00; A62B 18/02–025; A62B 18/084; A62B 18/086–088; A62B 7/10; A41D 13/11–1192
See application file for complete search history.

(56) References Cited

U.S. PATENT DOCUMENTS 5,682,879 A * 11/1997 Bowers ................ A62B 18/082 128/201.12
6,070,265 A * 6/2000 Tasbas ................... A41D 13/11 2/9
7,004,165 B1 * 2/2006 Salcido .................. A62B 23/06 128/205.27
11,154,102 B1 * 10/2021 Ahearn ................ A62B 23/025
2004/0020489 A1 * 2/2004 Gillespie ................ A62B 23/06 128/206.18
2018/0250537 A1 * 9/2018 Waterford .............. A62B 18/08
2021/0337893 A1 * 11/2021 Williams ........... A41D 13/1107
2022/0132949 A1 * 5/2022 Ambartsoumian .... A62B 23/06 128/206.19
2022/0142270 A1 * 5/2022 Sun .......................... A62B 9/02
2022/0167691 A1 * 6/2022 Watts ..................... A41D 13/11

FOREIGN PATENT DOCUMENTS

EP 1982750 A1 * 10/2008 ............. A62B 23/06

* cited by examiner

*Primary Examiner* — Rachel T Sippel

(74) *Attorney, Agent, or Firm* — Franklin & Associates International Inc; Matthew F. Lambrinos

(57) ABSTRACT

The nose mask is intended to be used during an airborne pandemic. The nose mask is a single triangle/cone shaped that covers only the nose, that comes with two ear elastic bands or a single head elastic band for support. The nose mask is designed to be disposable with a filter for better protection and to minimize the passage of aerosols, fluids and airborne pathogen agents or to be made with washable material allowing users to re-use it.

9 Claims, 9 Drawing Sheets

NOSE MASK

CROSS REFERENCE TO RELATED APPLICATIONS

This application is a continuation of U.S. Non-Provisional patent application Ser. No. 18/109,727, filed Feb. 14, 2023 at the United States Patent & Trade Mark Office, which is a continuation of U.S. Non-Provisional patent application Ser. No. 17/074,577, filed Oct. 19, 2020, at the United States Patent & Trade Mark Office, now U.S. Pat. No. 11,602,649 issued Mar. 14, 2023, the entire contents of each of which is incorporated herein by reference for continuity of disclosure.

BACKGROUND OF THE INVENTION

1.

The present invention relates generally to a nose mask that is designed to be worn by restaurants customers and dental patients more specifically at the time of a pandemic.

2. DESCRIPTION OF THE PRIOR ART

On airborne pandemic, face masks are first choice option for public protection, except when eating in public or when having dental treatment.

SUMMARY

In the case of the problems mentioned above, the present invention will provide a disposable, inexpensive, as well as reusable, nose mask to be used for everyone, especially for those eating in public or those receiving dental care for times during an airborne pandemic.

DETAILED DESCRIPTION

Figure 1:
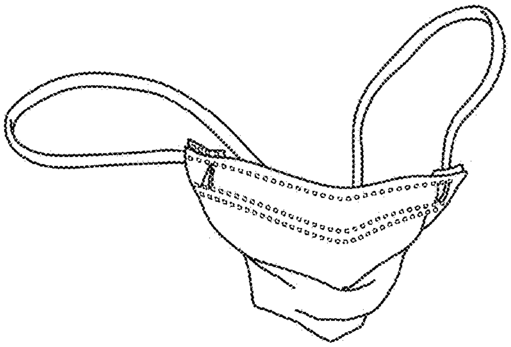
FIG. 1 illustrates a front view of a nose mask with two ears elastic bands according to a first embodiment.
Figure 2:
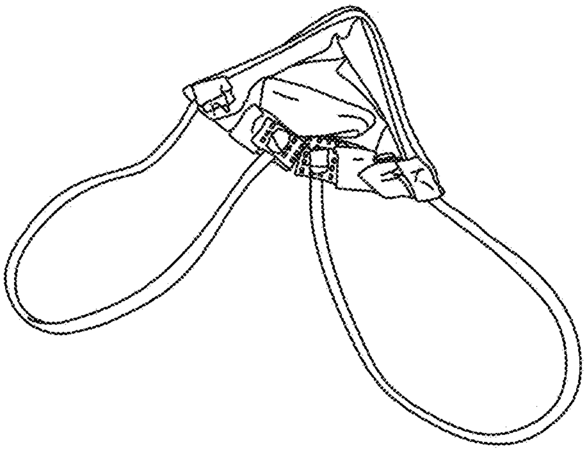
FIG. 2 illustrates a back view of the first embodiment of the nose mask.
Figure 3:
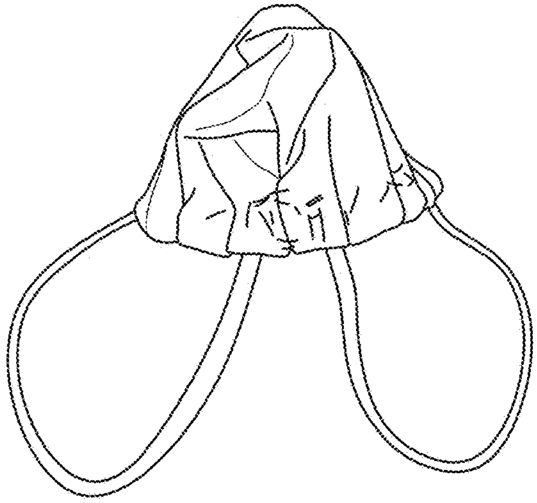
FIG. 3 illustrates a base view of the first embodiment of the nose mask.
Figure 4:
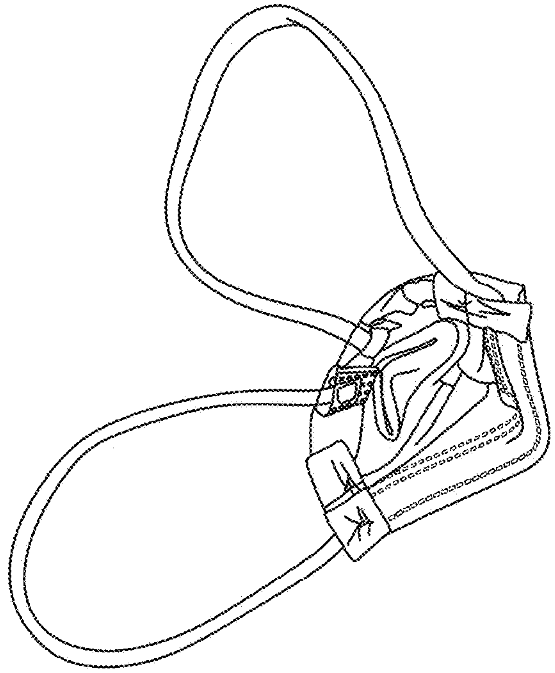
FIG. 4 illustrates a top view of the first embodiment of the nose mask.
Figure 5:
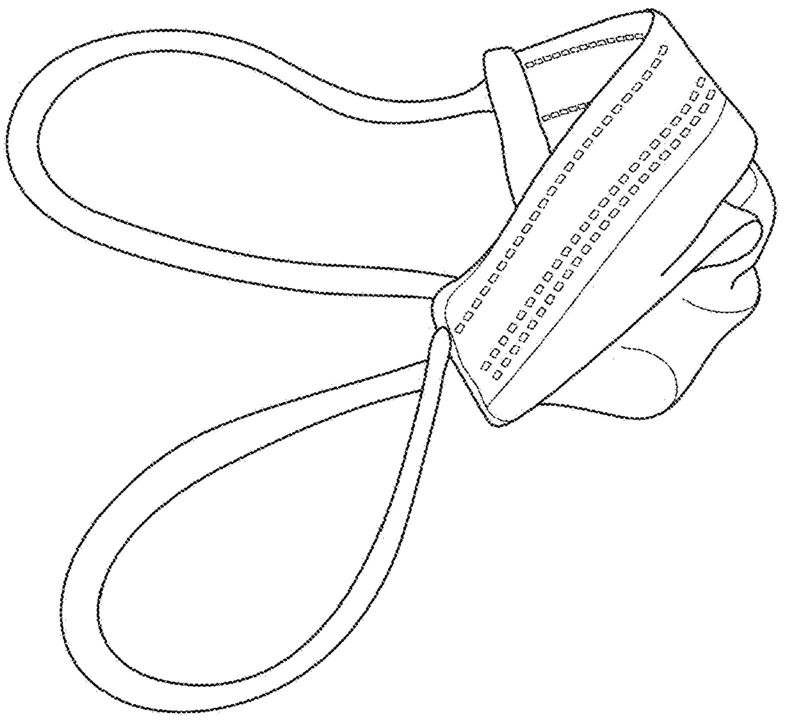
FIG. 5 illustrates a right side view of the first embodiment of the nose mask, the left side mirroring the right side.
Figure 6:
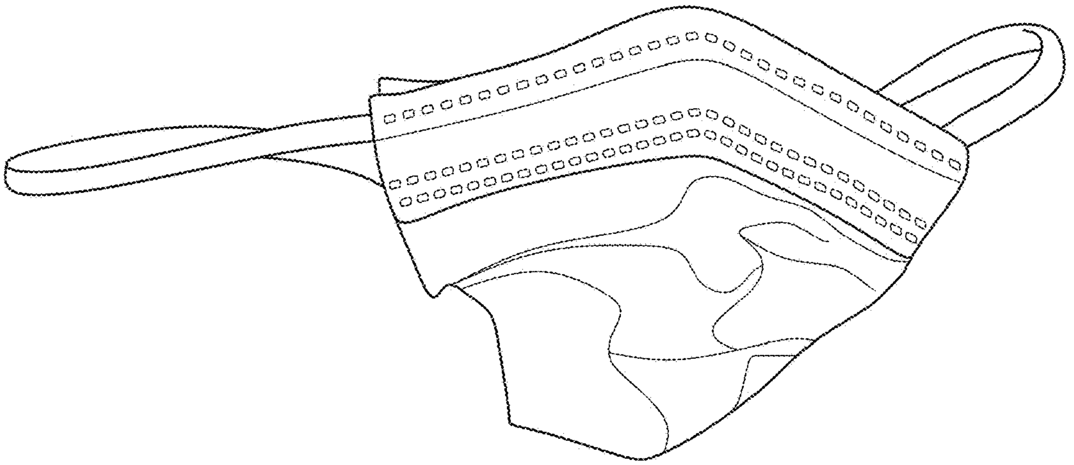
FIG. 6 is a closer front view of the first embodiment of the nose mask.
Figure 7:
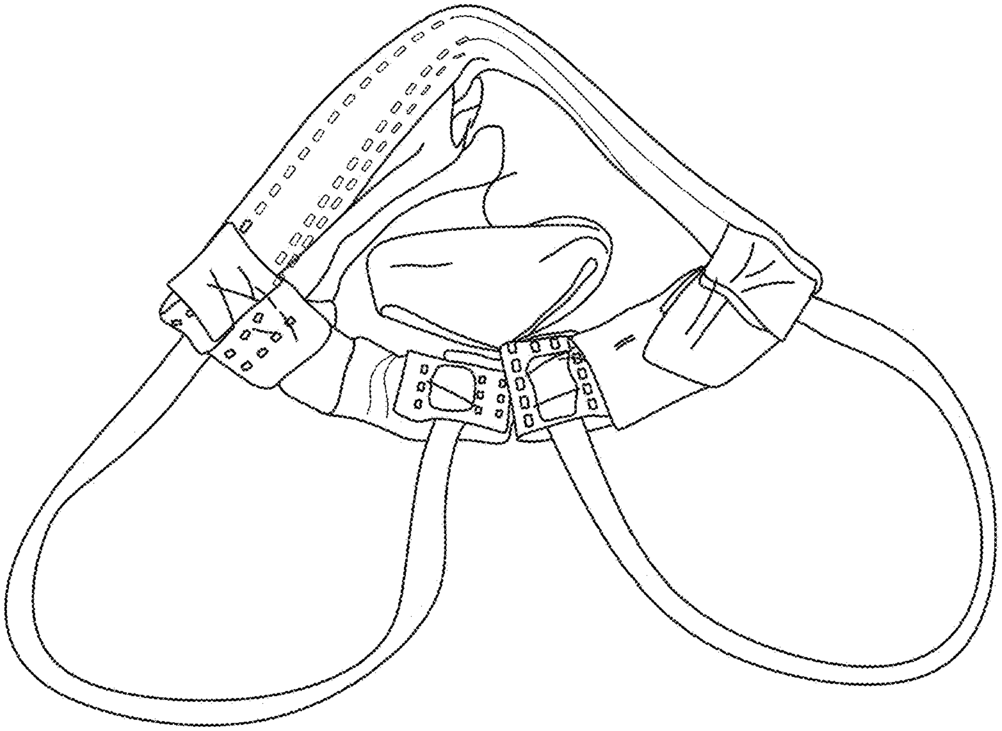
FIG. 7 is an internal view of the first embodiment of the nose mask.
Figure 8:
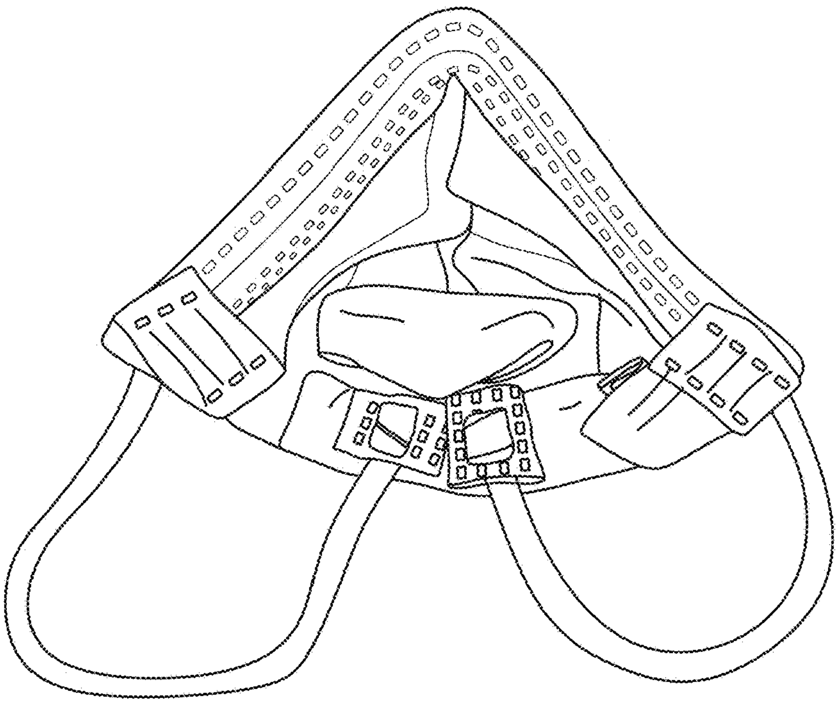
FIG. 8 is an inside view of the nose mask according to the first embodiment and shows a nasal seal and nose ridge.
Figure 9:
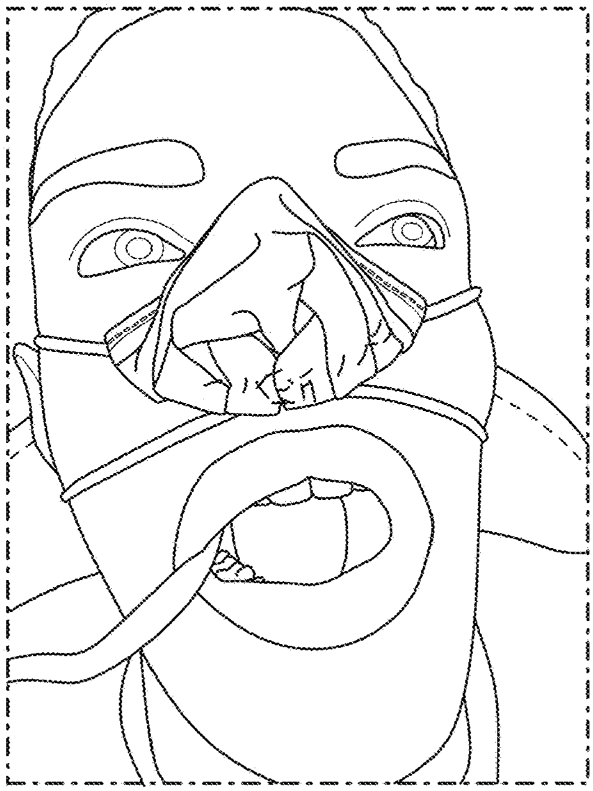
FIG. 9 illustrates a patient clearly showing base nose sealed by mask of the first embodiment, on a dental chair with incline position with open mouth, water and air at the time of dental treatment able to breathe 100% through nose.
Figure 10:
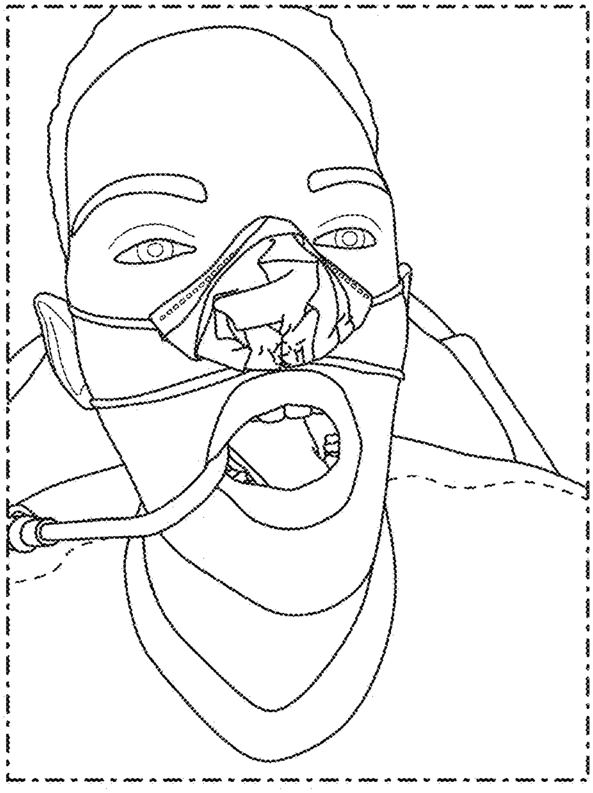
FIG. 10 illustrates a front view of the same patient on dental chair shown in FIG. 9, with the nose mask of the first embodiment fitted only over the nose, away from the wearer eyes, with plenty space to breath without the claustrophobic feeling.
Figure 11:
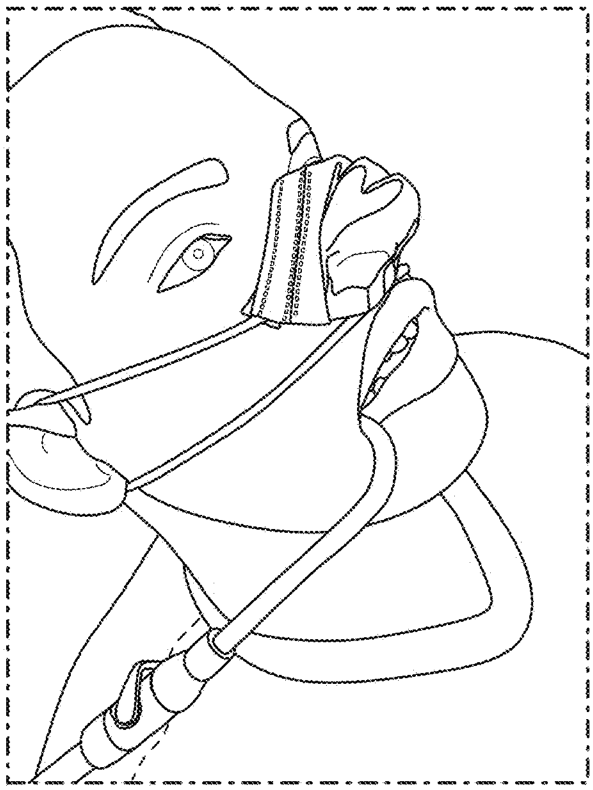
FIG. 11 illustrates a right side view of nose mask with ears bands according to the first embodiment, the left side mirroring the right side.
Figure 12:
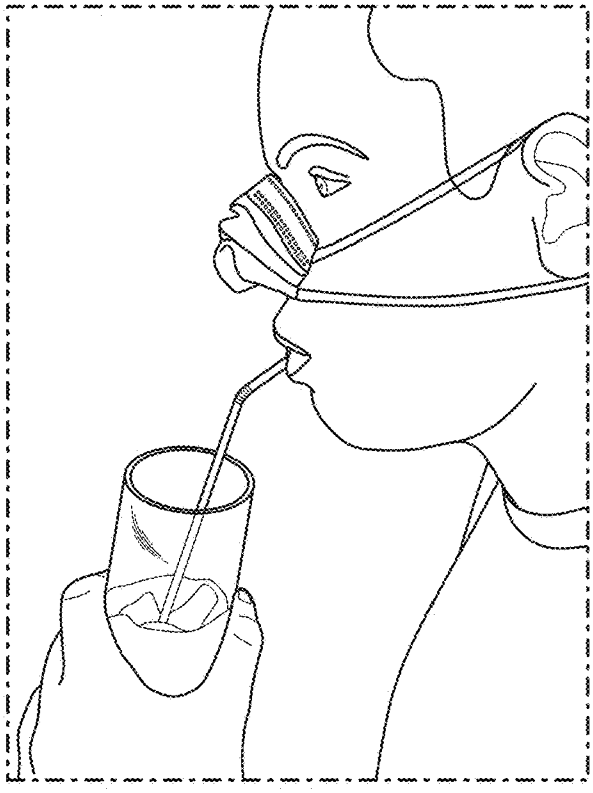
FIG. 12 illustrates a wearer wearing a nose mask of the first embodiment able to drink/eat, breathing 100% through nose.
Figure 13:
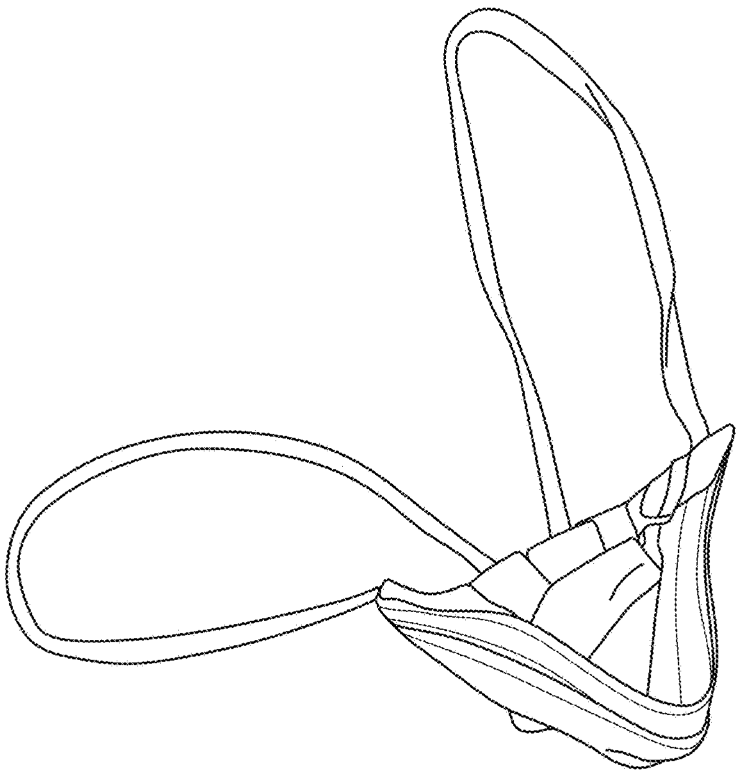
FIGS. 13 and 14 illustrate different views of the nose mask of the first embodiments, with two elastic ears band.
Figure 14:
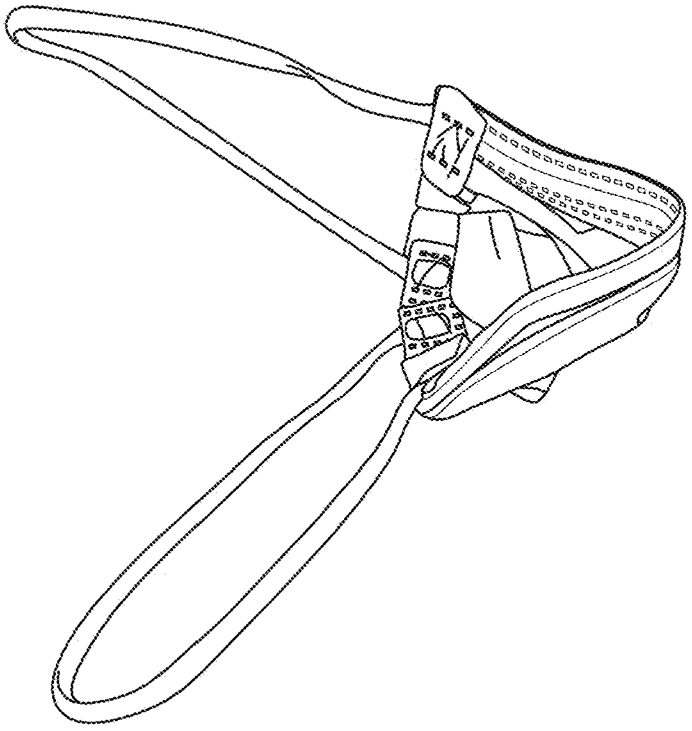
Figure 15:
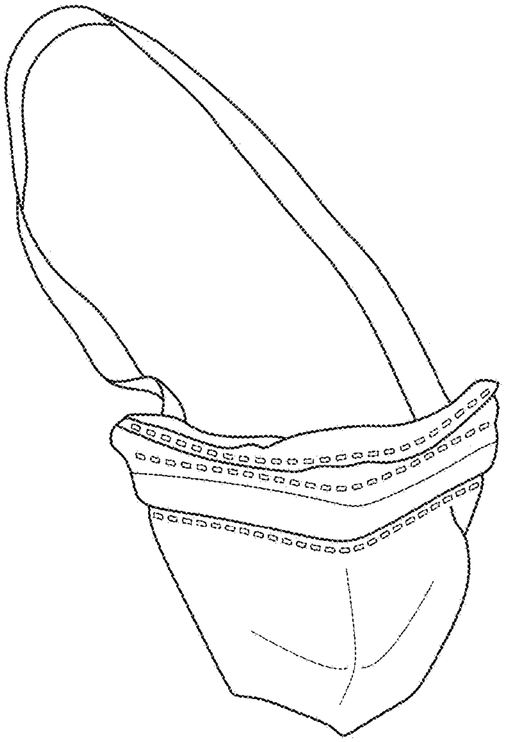
FIG. 15 illustrates a front view of a nose mask with a single head elastic band according to a second embodiment.
Figure 16:
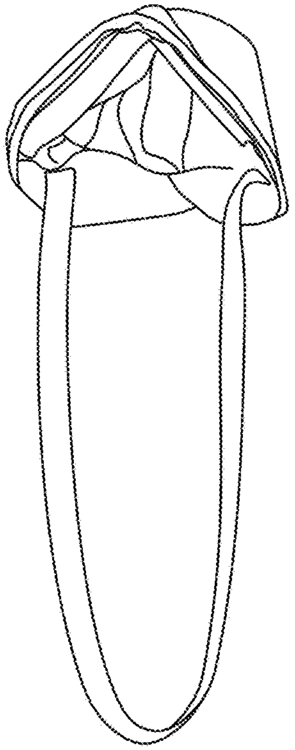
FIG. 16 illustrates a back view of the second embodiment of the nose mask.
Figure 17:
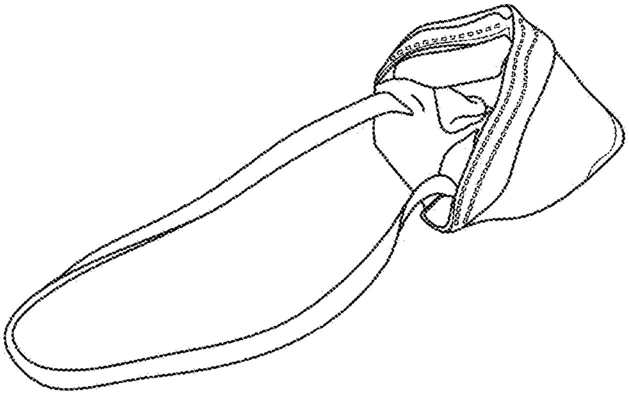
FIG. 17 illustrates a right side view of the second embodiment of the nose mask, the left side mirroring the right side.
Figure 18:
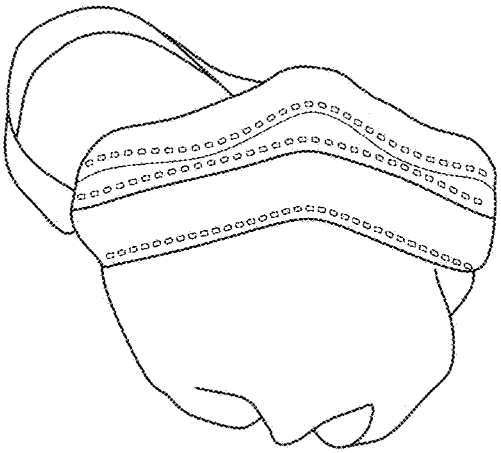
FIG. 18 is a closer front view of the second embodiment of the nose mask.
Figure 19:
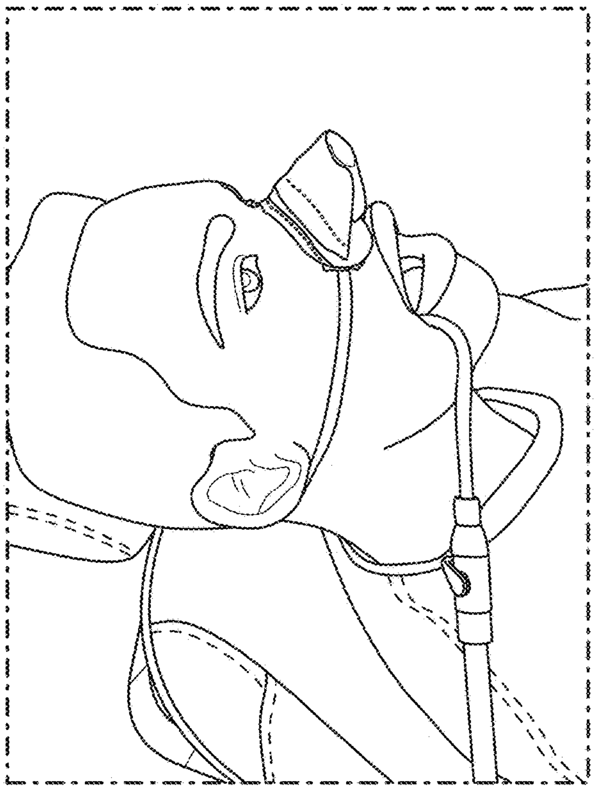
FIG. 19 is a lateral view of patient wearing nose mask with single head band of the second embodiment when receiving dental treatment.
Figure 20:
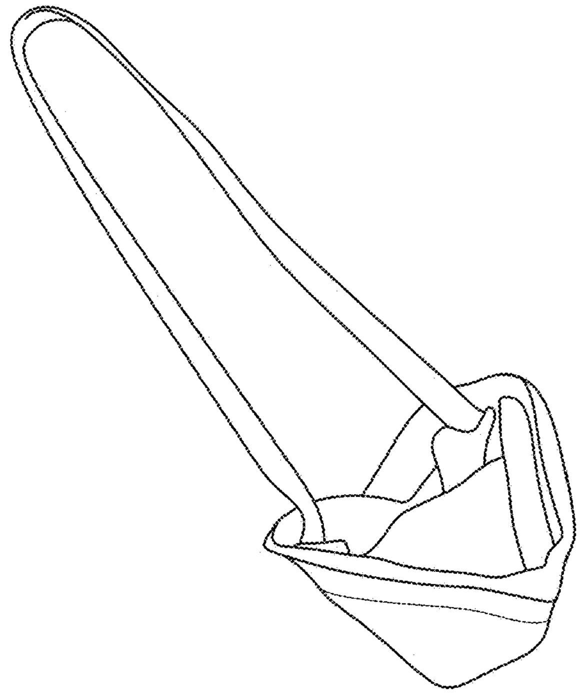
FIGS. 20 and 21 illustrate different respective back views of the nose mask of the second embodiment with a single elastic head band showing a slight layer of foam to sit at ridge of nose, for comfortability of wearer and to give better seal.
Figure 21:
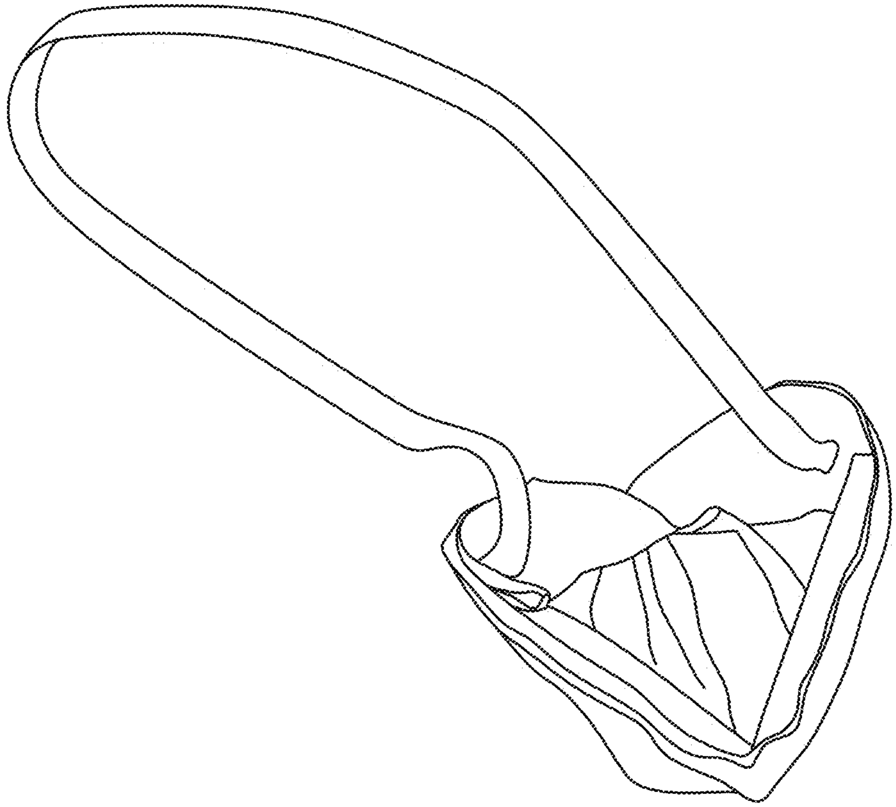

Using the nose mask the wearer will be able to eat and be protected simultaneously, as well as be protected at the time of dental treatment. At eating or receiving dental treatment, the normal anatomical reaction of mouth-air intake is blocked, switching to 100% nose intake. The present invention is a cone shape designed to be worn over the nose only. The superior angle of the triangle is outlined with a flexible band to sit and be adjusted on the nose's ridge to secure the mask. A slight foam layer inside of the superior angle that sits on the nose ridge for comfort of wearer. The invention is designed to allow wearer to breath comfortably while eating in public and when having dental treatment, decreasing substantially the inhaling of airborne pathogens at the time of large amount of aerosol flow like produced in a dental office. None of the face mask inventions describe this invention as claimed, neither do they expose the mouth to permit anyone to eat or have dental treatment without leaving them unprotected. All masks are designed to be worn over nose and mouth, and a person wearing one of them would need to remove it to be able to eat or to have dental treatment.

I claim:

1. A method comprising:

providing a disposable nose mask, the disposable nose mask comprising:

a singular, triangle-shaped cone, having a configuration symmetrical on either side of the triangle-shaped cone and forming an appropriately sized cone with enough space to cover a nose without covering a mouth, wherein the triangle-shaped cone has a base configured to sit below the nose; and a single elastic head-band that goes from one side of the base of one of said either sides to another side of the base of the opposite side of said either sides, wherein the single elastic head-band is configured for making pressure, creating a seal at a base of the nose; the disposable nose mask devoid of any other head-bands;

fitting the disposable nose mask only over a nose of a user, away from eyes of the user; and performing dental treatment on the user while the disposable nose mask is fitted only over the nose of the user.

2. The method of claim 1, wherein the disposable nose mask further comprises a malleable nose-piece configured to conform to a top edge of the nose.

3. The method of claim 1, wherein the disposable nose mask further comprises layers of filter.

4. The method of claim 1, wherein the triangle-shaped cone has an inside top angle surface, and the disposable nose mask further comprises a foam sealing strip attached to the inside top angle surface and is configured to sit on a ridge of the nose.

5. A method comprising providing a nose mask, the nose mask comprising:

a singular, triangle-shaped cone, having a configuration symmetrical on either side of the triangle-shaped cone and forming an appropriately sized cone with enough space to cover a nose and not a mouth, wherein the triangle-shaped cone has a base configured to sit below the nose; and a single elastic head-band that goes from one side of the base of one of said either sides to another side of the base of the opposite side of said either sides, wherein the single elastic head-band is configured for making pressure, creating a seal at a base of the nose; the nose mask devoid of any other head-bands;

fitting the nose mask only over a nose of a user, away from eyes of the user; and performing dental treatment on the user while the nose mask is fitted only over the nose of the user.

6. The method of claim 5, wherein the triangle-shaped cone has an inside top angle surface, and the nose mask further comprises a foam sealing strip attached to the inside top angle surface and is configured to sit on a ridge of the nose.

7. The method of claim 5, wherein the nose mask further comprises a malleable nose-piece configured to conform to a top edge of the nose.

8. The method of claim 5, wherein the nose mark comprises layers of filter.

9. The method of claim 5, wherein the nose mask is washable.

* * * * *